(12) United States Patent
Zhang et al.

(10) Patent No.: US 10,955,897 B2
(45) Date of Patent: Mar. 23, 2021

(54) POWER CONTROL METHOD AND ELECTRONIC APPARATUS USING THE SAME

(71) Applicant: Wistron Corporation, New Taipei (TW)

(72) Inventors: Sai Zhang, New Taipei (TW); Zxl Zhang, New Taipei (TW)

(73) Assignee: Wistron Corporation, New Taipei (TW)

( * ) Notice: Subject to any disclaimer, the term of this patent is extended or adjusted under 35 U.S.C. 154(b) by 163 days.

(21) Appl. No.: 16/362,718

(22) Filed: Mar. 25, 2019

(65) Prior Publication Data

US 2020/0183480 A1 Jun. 11, 2020

(30) Foreign Application Priority Data

Dec. 7, 2018 (CN) .......................... 201811496057.X

(51) Int. Cl.
| | | |
|---|---|---|
| G06F 1/32 | (2019.01) | |
| G06F 3/041 | (2006.01) | |
| G06F 1/16 | (2006.01) | |
| G06F 1/3234 | (2019.01) | |

(52) U.S. Cl.
CPC ............ *G06F 1/3234* (2013.01); *G06F 3/041* (2013.01); *G06F 1/1643* (2013.01)

(58) Field of Classification Search
CPC ....... G06F 1/3234; G06F 3/041; G06F 1/1643
See application file for complete search history.

(56) References Cited

U.S. PATENT DOCUMENTS

| | | | | |
|---|---|---|---|---|
| 7,428,142 | B1* | 9/2008 | Ligtenberg | G06F 1/1616 |
| | | | | 345/157 |
| 9,439,309 | B2 | 9/2016 | Shen et al. | |
| 2013/0009858 | A1* | 1/2013 | Lacey | H04M 1/0245 |
| | | | | 345/156 |
| 2013/0205142 | A1* | 8/2013 | Jung | G06F 1/1677 |
| | | | | 713/300 |

(Continued)

FOREIGN PATENT DOCUMENTS

| | | |
|---|---|---|
| TW | I499936 | 9/2015 |
| TW | I602417 | 10/2017 |

OTHER PUBLICATIONS

"Office Action of Taiwan Counterpart Application", dated Feb. 27, 2020, p. 1-p. 6.

*Primary Examiner* — Stefan Stoynov
(74) *Attorney, Agent, or Firm* — JCIPRNET

(57) ABSTRACT

A power control method applicable to an electronic apparatus having a first electronic element and a second electronic element which can be opened and closed toward to each other. The power control method includes the following steps: providing a plurality of power modes on the electronic apparatus; detecting a trigger signal generated from a close operation of the first electronic element and the second electronic element; detecting touch information generated in response to the first electronic element or the second electronic element being touched; determining a close gesture according to the trigger signal and the touch information; and selecting and operating in a corresponding power mode within the plurality of power modes by the electronic device according to a correspondence relationship of the close gesture and the plurality of power modes.

11 Claims, 5 Drawing Sheets

(56) References Cited

U.S. PATENT DOCUMENTS

| | | |
|---|---|---|
| 2014/0049147 A1 | 2/2014 | Shen et al. |
| 2015/0097788 A1* | 4/2015 | Sip .................. G06F 1/1677 |
| | | 345/173 |
| 2018/0176347 A1* | 6/2018 | Jeon .................. G06F 3/041 |

* cited by examiner

POWER CONTROL METHOD AND ELECTRONIC APPARATUS USING THE SAME

CROSS-REFERENCE TO RELATED APPLICATION

This application claims the priority benefit of China application serial no. 201811496057.X, filed on Dec. 7, 2018. The entirety of the above-mentioned patent application is hereby incorporated by reference herein and made a part of this specification.

BACKGROUND OF THE INVENTION

Field of the Invention

The invention relates to a power control method, and more particularly to a power control method of an electronic apparatus having a plurality of power modes and a flip screen.

Description of Related Art

With the increasing popularity of notebooks, more and more people adopt notebooks as tools for work and entertainment. Nowadays, notebooks are getting thinner and lighter as well as more portable. Thus, users may easily take their notebooks to a variety of different occasions. In general, when people close the screens when moving the notebooks. However, the current system may only set one kind of power control regarding closing the screen. Therefore, it is inconvenient in many shell casings.

For example, it is assumed that the system presets to switch to sleep mode when the screen is closed. When the user takes the notebook to the conference room for a meeting, the screen of the notebook is closed and is taken to the conference room. At this point, since the notebook will be used again soon, the users would like to maintain a normal operation without changing the power setting of the notebook when the screen is closed. However, the preset system is switched to sleep mode. In addition, when the user gets off work, he or she often wants to directly shut down the notebook by closing the screen, so that the manual shutdown process may be omitted (e.g., pressing the power button or clicking the shutdown icon on the operating system). Yet, the preset system is switched to sleep mode.

SUMMARY OF THE INVENTION

In view of this, an embodiment of the invention provides a power control method and an electronic apparatus using the same, which is able to detect gestures when the user closes a flip screen. In addition, according the gestures, corresponding power control is performed to improve inconvenience.

A power control method of the embodiment of the invention is applicable to an electronic apparatus having a first electronic component and a second electronic component which may be opened and closed toward to each other. The power control method includes the following steps. A plurality of power modes on the electronic apparatus is provided. A trigger signal generated from a close operation of the first electronic component relative to the second electronic component is detected. Touch information generated in response to the first electronic component or the second electronic component is touched is detected. A close gesture is determined according to the trigger signal and the touch information. In addition, according to a correspondence relationship of the close gesture and the plurality of power modes, a corresponding power mode within the plurality of power modes is selected and operated by the electronic device.

The electronic apparatus of the embodiment of the invention has a plurality of power modes, and includes a first electronic component and a second electronic component which may be opened and closed toward each other, an open-close detector, at least one touch sensor, and a processor. The open-close detector is configured to detect a close operation of the first electronic component relative to the second electronic component to generate a trigger signal. The touch sensor is disposed on at least one of the first electronic component and the second electronic component, configured to generate touch information in response to a touch event is sensed. The processor is coupled to the open-close detector and the at least one touch sensor, and is configured to determine a close gesture according to the trigger signal and the touch information. Furthermore, according to a correspondence relationship of the close gesture and the plurality of power modes, a corresponding power mode within the plurality of power modes is selected and operated.

To make the aforementioned more comprehensible, several embodiments accompanied with drawings are described in detail as follows.

DESCRIPTION OF THE EMBODIMENTS

Figure 1:
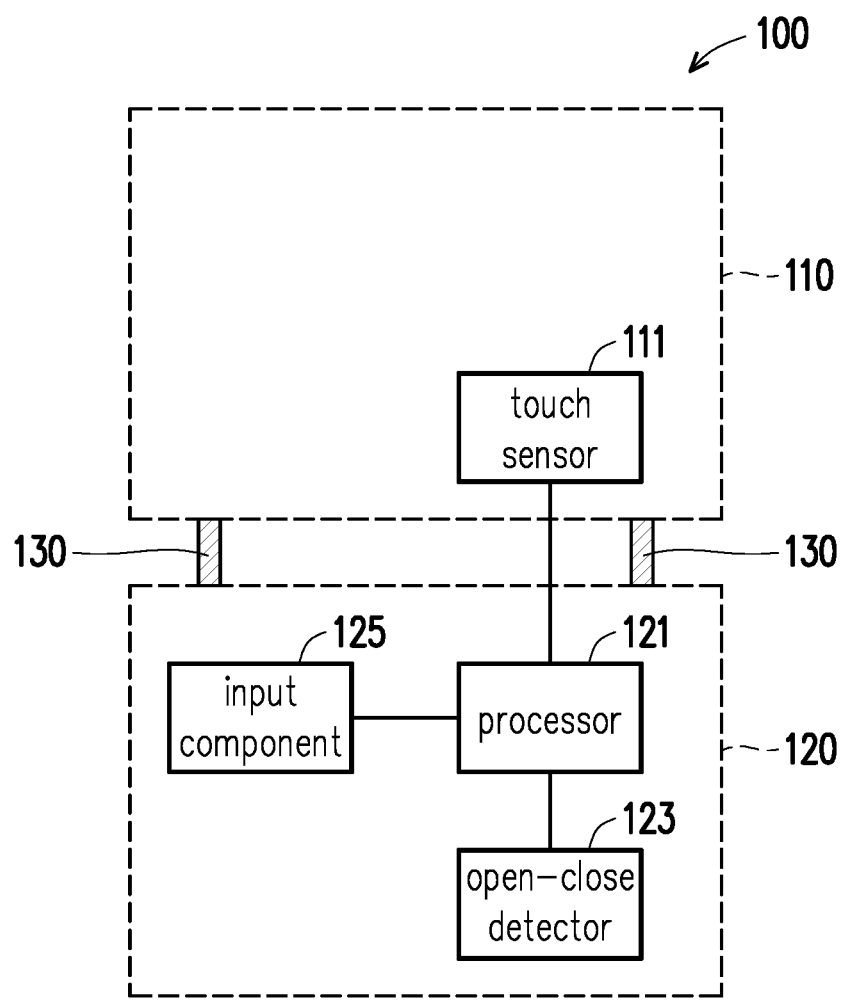
FIG. 1 illustrates a schematic block diagram of an electronic apparatus according to an embodiment of the invention.

FIG. 1 illustrates a schematic block diagram of an electronic apparatus according to an embodiment of the invention.

Please refer to FIG. 1. An electronic apparatus 100 is composed of a flip screen 110 and a host 120. There is a pivoting portion 130 between the flip screen 110 and the host 120, so that the flip screen 110 and the host 120 are foldable, and the flip screen 110 may be closed on the host 120 when needed. In some embodiments, the electronic apparatus 100 is, for example, a notebook, a flip mobile phone, a handheld gaming console, or devices alike. However, types of the electronic apparatus 100 of the invention are not limited thereto. The flip screen 110 includes a shell casing and a display installed in the casing. Hereinafter, when the user touches the flip screen 110 by hand is mentioned, it refers to touching (one or some parts of) the shell casing.

In this embodiment, one or a plurality of touch sensors 111 is disposed on the shell casing of the flip screen 110 or a predetermined position adjacent to the shell casing (hereinafter referred to as "shell casing") on the inside of the flip screen 110. A processor 121, an open-close detector 123 and an input component 125 are disposed in the host 120. The touch sensor 111, the open-close detector 123 and the input component 125 are all coupled to the processor 121. It should be noted that the positions of the processor 121, the open-close detector 123, and the input component 125 of the invention are not limited thereto. People skilled in the art may dispose these components respectively in the flip screen 110 and/or the host 120 based on their needs.

The touch sensor 111 disposed on the shell casing of the flip screen 110 is configured to acquire touch information according to a touch event of the user. When the user closes the flip screen 110, the processor 121 acquires the position and quantity of the touch sensor 111 touched by the user's hand when the flip screen 110 is closed through the touch information of the touch sensor 111. In this embodiment, the touch sensor 111 is a force sensing resistor, a resistance value of which varies along with the force applied to the sensing area. Therefore, once the force sensing resistor is connected to a circuit, pressure in the sensing area is determined according to the current detected in the circuit. However, the invention is not limited thereto. The touch sensor 111 may also be other types of detectors, such as a capacitive detector, a photosensitive detector, a switched detector, and the like. As long as the component is able to detect the user's touch event and generate the touch information accordingly, it is applicable.

The processor 121 is configured to be responsible for the overall operation of the electronic apparatus 100, including determining a power mode of the electronic apparatus 100. In this embodiment, the provided power mode may include at least one of shutdown, standby, sleep, hibernate, and a normal working status in accordance with the advanced configuration and power interface (ACPI) standard regulation. However, the invention is not limited thereto. The processor 121 may be, for example, a dual-core, quad-core, or octa-core central processing unit (CPU), a system-on-chip (SOC), an application processor, a media processor, or the like. However, the type of the processor of the invention during implementation is not limited thereto.

The open-close detector 123 is configured to detect a close operation of the flip screen 110. Specifically, the processor 121 acquires whether the flip screen 110 is covered according to a signal from the open-close detector 123. In this embodiment, the open-close detector 123 may be a Hall detector or other magnetic detectors. In other embodiments, the open-close detector 123 may be an angle detector configured, so that a trigger signal is sent to the processor 121 when the angle between the flip screen 110 and the host 120 is smaller than the threshold angle. In other embodiments, the open-close detector 123 may also be any proximity detector (such as a photosensitive detector, shooting lens, etc.) configured to detect whether the distance between the flip screen 110 and the host 120 is smaller than a predetermined distance. In other embodiments, the open-close detector 123 may also be any contact detector (such as a contact switch, etc.) configured to detect whether the flip screen 110 is closed on the host 120. In other words, the specific methods of the close operation of flip screen 110 of the invention are not limited thereto.

The input component 125 is configured to receive external signals. The input component 125 is, for example, one of a keyboard, a mouse, a microphone, a touch screen or a combination thereof. However, the specific type of the input component configured to receive the external signals of the invention is not limited thereto.

Figure 2:
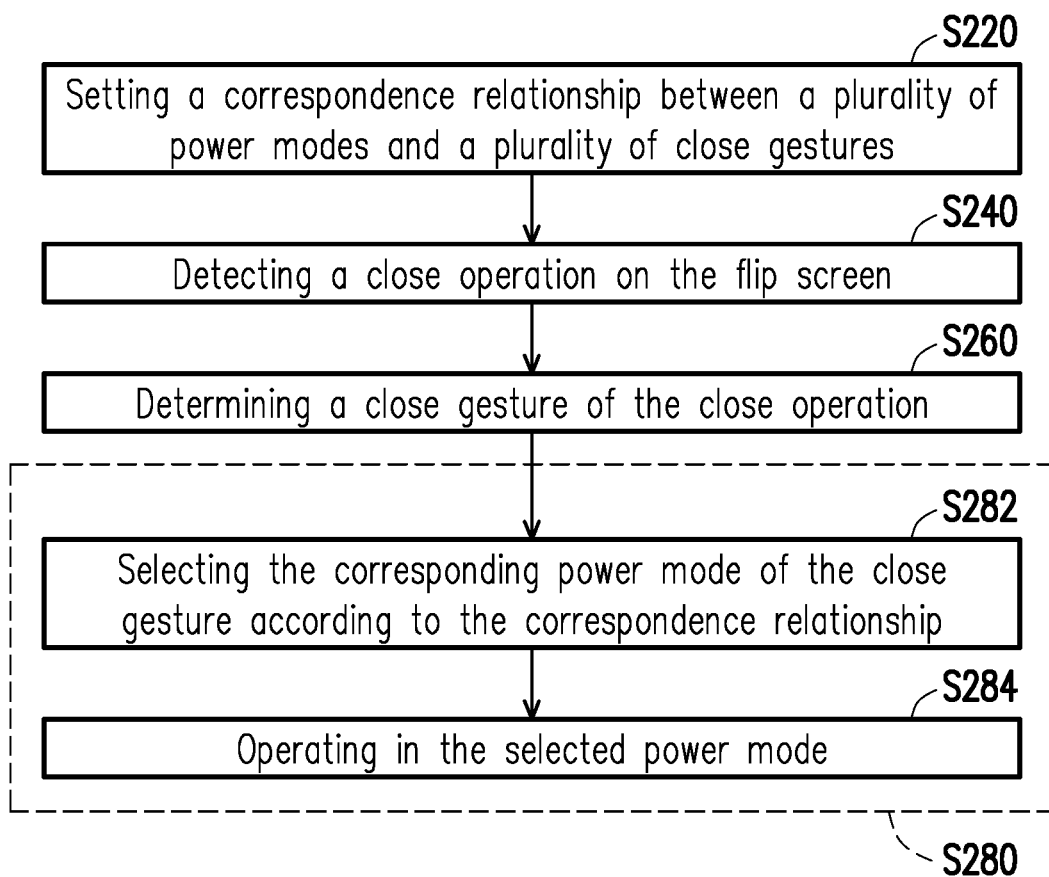
FIG. 2 illustrates a flow chart of a power control method according to an embodiment of the invention.

FIG. 2 illustrates a flow chart of a power control method according to an embodiment of the invention. The power control method is described below complemented with the electronic apparatus 100 in the embodiment of FIG. 1. It should be noted that the power control method of the embodiment of the invention is not limited to the electronic apparatus 100 applied in the FIG. 1 embodiment.

Please refer to FIG. 2. First, the processor 121 receives a setting of the correspondence relationship between a plurality of power modes and a plurality of close gestures (step S220). Specifically, the user may selectively set the corresponding power modes of the electronic apparatus 100 operated after the flip screen 110 is closed by different close gestures through inputting a setting signal by the input component 125.

Figure 3A:
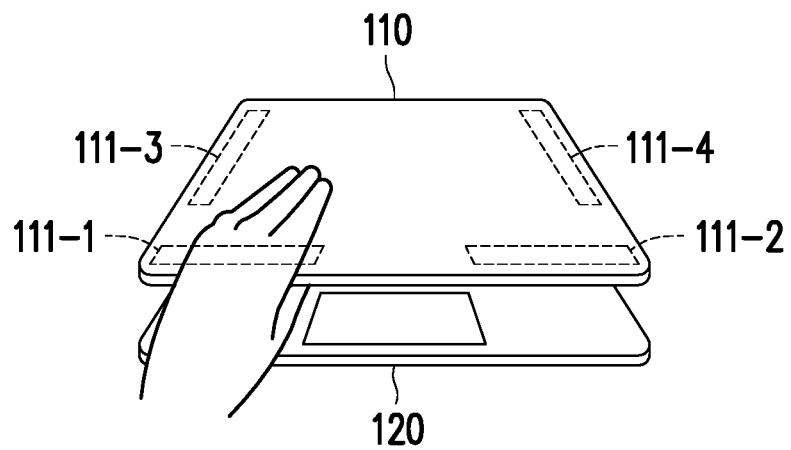
FIG. 3A to FIG. 3D illustrate schematic views of a plurality of close gestures according to an embodiment of the invention.
Figure 3B:
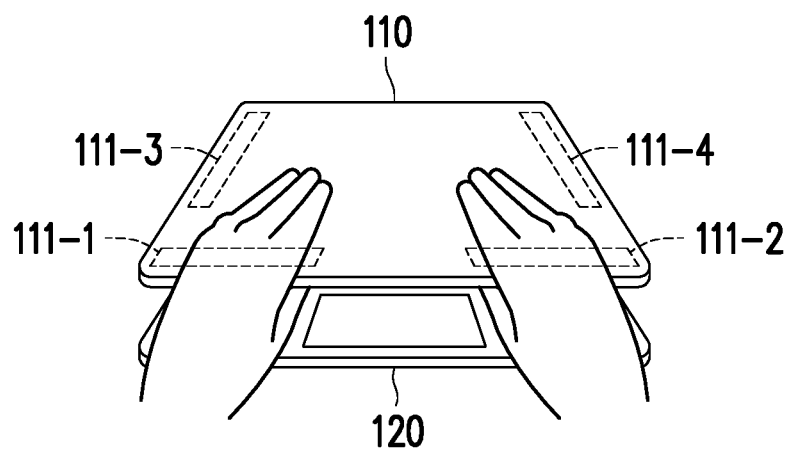
Figure 3C:
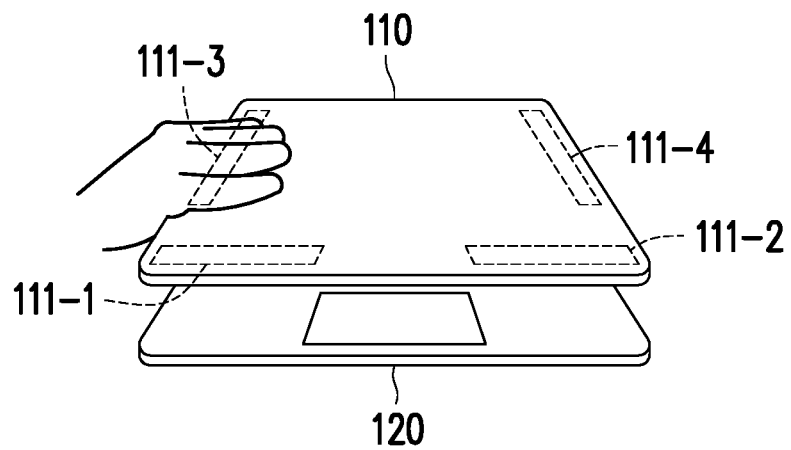
Figure 3D:
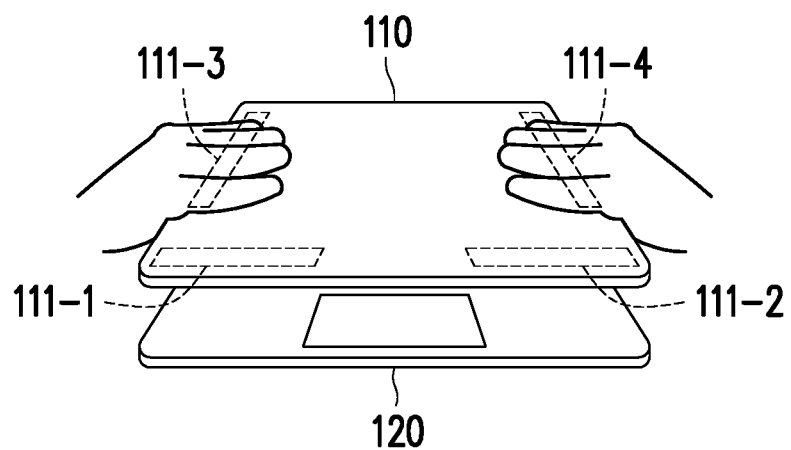
Figure 4:
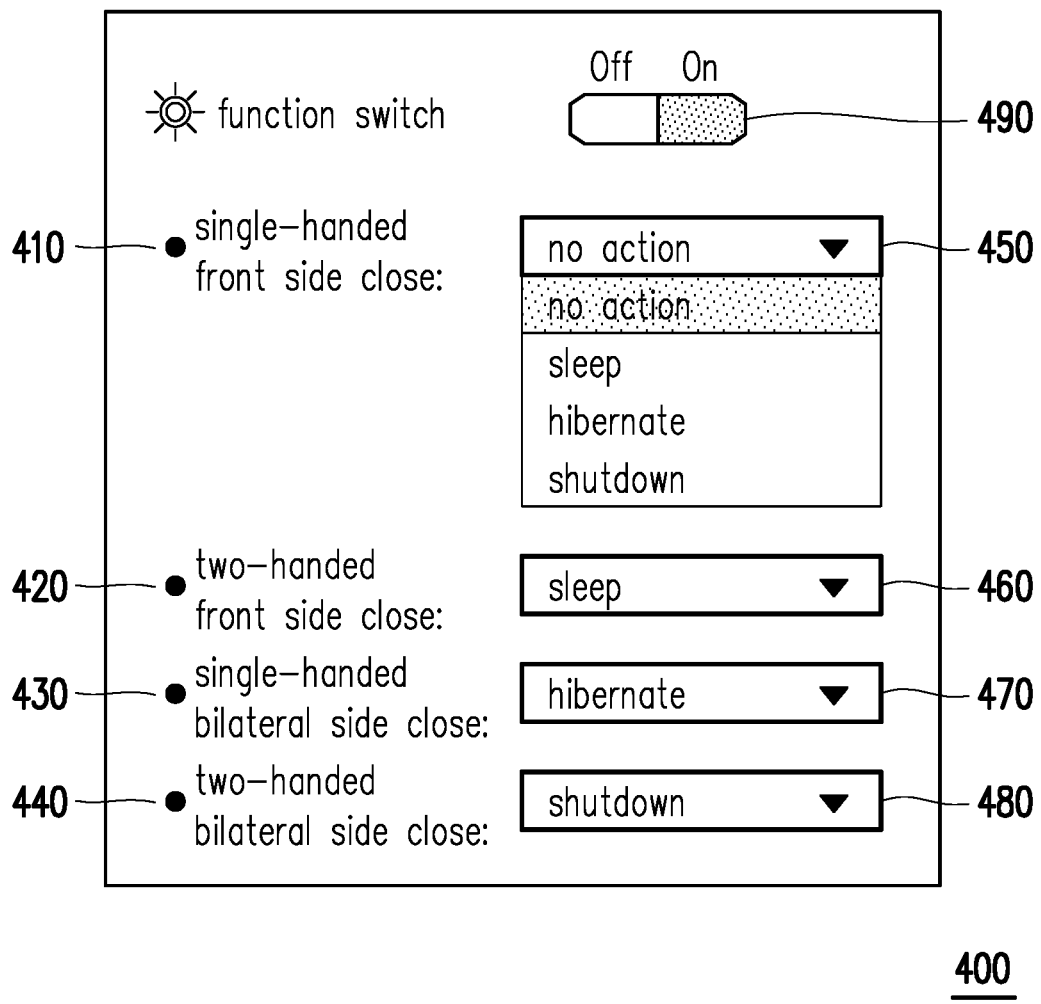
FIG. 4 illustrates a schematic view of setting a correspondence relationship of a plurality of close gestures and a plurality of power modes according to an embodiment of the invention.

FIG. 3A to FIG. 3D illustrate schematic views of a plurality of close gestures according to an embodiment of the invention. FIG. 4 illustrates a schematic view of setting a correspondence relationship of a plurality of close gestures and the plurality of power modes according to an embodiment of the invention.

In this embodiment, the plurality of close gestures includes "single-handed front side close", "two-handed front side close", "single-handed bilateral side close" and "two-handed bilateral side close", etc. In detail, the "single-handed front side close" as illustrated in FIG. 3A indicates that the flip screen 110 is closed by single-handed touch on the front side of the flip screen 110 (or indicated as a top portion when the screen is vertically opened) by the user. The "two-handed front side close" as illustrated in FIG. 3B indicates that the flip screen 110 is closed by two-handed touch on the front side of the flip screen 110 by the user. The "single-handed bilateral side close" as illustrated in FIG. 3C indicates that the flip screen 110 is closed by single-handed touch on the left or right side of the flip screen 110 by the user. The "two-handed bilateral side close" as illustrated in FIG. 3D indicates that the flip screen 110 is closed by simultaneous touch with both hands respectively on the left or right side of the flip screen 110 by the user.

Please refer to FIG. 4. In this embodiment, a setting interface 400 is provide by a display (not illustrated) of the electronic apparatus 100. In addition, the user may selectively set a plurality of power modes 450, 460, 470, 480 corresponding to a plurality of close gestures 410, 420, 430, 440 through the input component 125 and the setting interface 400. In some embodiments, the setting interface 400 further provides a function switch 490, configured for the user to select whether to enable this function.

In this embodiment, the close gesture 410 of the "single-handed front side close" is, for example, corresponding to "no action" of the power mode 450. The close gesture 420 of the "two-handed front side close" is, for example, corresponding to "sleep" of the power mode 460. The close gesture 430 of "single-handed bilateral side close" is, for example, corresponding to "hibernate" of the power mode 470. The close gesture 440 of "two-handed bilateral side close" is, for example, corresponding to "shutdown" of the power mode 480. In particular, the "no action" selection is further included in the menu for setting the power mode, which indicates that the current power mode is maintained and the power mode is not switched by the close operation.

Please return back to FIG. 2. After the correspondence relationship of the plurality of close gestures and the plurality of power modes is set, the processor 121 detects the close operation on the flip screen 110 (step S240), and determines the close gesture of the close operation (step S260). Specifically, the processor 121 detects whether the flip screen 110 is covered through the open-close detector 123, and determines that in which kind of the close gesture the flip screen 110 is covered according to the touch information from the touch sensor 111.

In this embodiment, the touch sensor 111 is the force sensing resistor. Therefore, the touch information may be generated at any time. In addition, the processor 121 also acquires the position where the flip screen 110 is touched according to the touch information at any time. In this embodiment, after the processor 121 receives the trigger signal of the close operation from the open-close detector 123, the close gesture of which the flip screen 110 is covered is determined according to the touch information from the touch sensor 111. The operation period of the close operation is determined according to the trigger signal. For example, the processor 121 defines a predetermined period (for example but not limited to, 3 seconds, etc.) from receiving the trigger signal of the close operation as an operation period of the close operation. For example, when the processor 121 receives the trigger signal of the close operation, the processor 121 determines whether the touch information of the touch sensor 111 is continuously received within 3 seconds before this time point. If yes, the corresponding power mode is entered according to the setting of the aforementioned FIG. 4. If not, the corresponding power mode (irrelevant to the touch operation gesture) is entered according to the conventional setting of the electronic apparatus 100. In other words, the processor 121 determines whether the trigger signal of the close operation and the touch information of the touch sensor 111 are received at a certain time.

The specific methods of the close gesture of the close operation are described in detail in the following embodiments.

Apart from illustrating various close gestures of an embodiment of the invention, schematic views of FIG. 3A to FIG. 3D further illustrate a configuration of the touch sensor according to an embodiment of the invention. Generally, an upper cover of the flip screen 110 includes an inner surface, an outer surface, and four sides, where the inner surface indicates the surface facing the host after the flip screen 110 is closed, and the outer surface indicates the other surface relative to the inner surface.

Please refer to FIG. 3A to FIG. 3D. In some embodiments, the touch sensor 111, for example, includes touch sensors 111-1, 111-2, 111-3, and 111-4, respectively disposed on front side, left side, right side of the flip screen 110 before closing. As such, the processor 121 acquires which of the touch sensor 111-1, 111-2, 111-3, and 111-4 are touched according to the touch information, and further determines the close gestures of the close operation. For example, if the processor 121 acquires that only the touch sensor 111-1 or 111-2 is touched according to the touch information during the operation period of the close operation, the close gesture of the close operation as "single-handed front side close" is determined. If the processor 121 acquires that both the touch sensor 111-1 and 111-2 are touched according to the touch information during the operation period of the close operation, the close gesture of the close operation as "two-handed front side close" is determined. If the processor 121 acquires that only the touch sensor 111-3 or 111-4 is touched according to the touch information during the operation period of the close operation, the close gesture of the close operation as "single-handed bilateral side close" is determined. If the processor 121 acquires that only the touch sensor 111-3 and 111-4 are touched according to the touch information during the operation period of the close operation, the close gesture of the close operation as "two-handed bilateral side close" is determined.

It should be illustrated that the specific position of the disposed touch sensor 111 of the invention is not limited thereto. As long as the processor 121 may determine the close gesture of the close operation according to the touch information of the touch sensor 111 at different positions, people skilled in the art may dispose the touch sensor 111 to any position of the upper cover of the flip screen 110 based on needs, such as at least one of the inner surface, the side and the outer surface, or the combination thereof. Furthermore, for example, the position of the disposed touch sensor 111 may be on each side of the upper cover (of the inner or outer cover), or the inner or the outer surface of the upper cover is adjacent to each side (collectively referred to as the side disposed on the upper cover). Alternatively, each of the touch sensor 111 may be disposed on the upper cover or disposed on an internal electronic component such as a circuit board or a display disposed in the upper cover (collectively referred to as disposed on the upper cover). Likewise, in other embodiments of the invention, the touch sensor 111 may also be disposed on the host 120, for example, at least one of the inner surface, sides, and the outer surface, or the combination thereof, etc. The configuration disposed on the host may be the same as described above. In addition, the specific disposed quantity of the touch sensor 111 of the invention is not limited thereto. In the FIG. 3A to FIG. 3D of the aforementioned embodiment, two of the touch sensor 111 on the front sides and one of the touch sensor 111 on each side of the left side and the right side are illustrated as examples. However, in fact, in other embodiments of the invention, only one of the touch sensor 111 on the side (for example, only on the front side) may be provided, one of the touch sensor 111 on the front side and one of the touch sensor 111 on the left side or the right side may be provided, or one of the touch sensor 111 on the front side and one of the touch sensor 111 on each side of the left side and the right side may be provided.

Please refer back to FIG. 2. After determining the close gesture of the close operation, the processor 121 switches between the plurality of power modes according to the determined closed gesture (Step S280). In detail, the processor 121 selects the corresponding power mode of the determined close gesture according to the set correspondence relationship between the plurality of close gestures and the plurality of power modes (Step S282). Then, the selected power mode is operated in the electronic apparatus 100 (Step S284). Take the correspondence relationship in the embodiment of FIG. 4 as an example. If the processor 121 determines the close gesture of the close operation as "single-handed front side close", the electronic apparatus 100 maintains the original operation mode. If the processor 121 determines the close gesture of the close operation as "two-handed bilateral side close", the electronic apparatus 100 operates in the power mode of "sleep." If the processor 121 determines the close gesture of the close operation as "single-handed bilateral side close gesture", the electronic apparatus 100 operates in the power mode of "hibernate." If the processor 121 determines the close gesture of the close operation as "two-handed front side close", the electronic apparatus 100 is shut down.

However, it should be noted that the electronic apparatus illustrated in the above embodiments of the invention is a preferred example of a notebook which pivots the host structure with the screen, a flip cellphone, or a handheld game console, and the like, and it is not indicated that the applicable electronic apparatus of the invention is only limited to the structure of the screen together with the host. In fact, the terms "screen" and "host" as applied in the invention may be generally indicated or replaced to any electronic component that may be pivoted and relatively opened to each other.

In summary of the above, the power control method and the electronic apparatus using the same detect the close gesture of the user touching the screen cover when the user closes the flip screen. After the flip screen is closed based on the close gesture, the electronic apparatus is operated in the corresponding power mode. The flexibility of the power control is increased and the inconvenience of use is improved.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A power control method for an electronic apparatus having a first electronic component and a second electronic component which are opened and closed toward each other, the power control method comprising:
    providing a plurality of power modes on the electronic apparatus;
    detecting a trigger signal generated from a close operation of the first electronic component relative to the second electronic component;
    detecting touch information generated in response to the first electronic component or the second electronic component being touched;
    determining a close gesture according to the trigger signal and the touch information; and
    selecting and operating in a corresponding power mode within the plurality of power modes by the electronic device according to a correspondence relationship of the close gesture and the plurality of power modes,
    wherein the electronic apparatus further provides a setting interface, the method further comprises:
    receiving the correspondence relationship of the close gesture and the plurality of power modes selectively set by an input device through the setting interface.

2. The power control method according to claim 1, wherein the first electronic component is a screen, and the second electronic component is a host having a processor, and the processor is configured to perform the power control method.

3. The power control method according to claim 2, wherein at least one touch sensor is disposed on at least one of the first electronic component and the second electronic component, and generates the touch information when the at least one touch sensor senses a touch event.

4. The power control method according to claim 3, wherein there are two touch sensors disposed on the at least one of the first electronic component and the second electronic component, and are located on the same side of the at least one of the first electronic component and the second electronic component, in response to only one of the touch sensors being touched, a single-handed close gesture is determined, in response to both of the touch sensors being touched, a two-handed close gesture is determined.

5. The power control method according to claim 3, wherein the at least one touch sensor is disposed on each of two different sides of the at least one of the first electronic component and the second electronic component, in response to only the at least one touch sensor on one of the sides being touched, a single-handed side close gesture is determined, in response to the at least one touch sensor on both of the sides being touched, a two-handed close gesture is determined.

6. The power control method according to claim 1, wherein the power modes comprise at least one of shutdown, standby, sleep, hibernate, and maintaining original working status.

7. An electronic apparatus, having a plurality of power modes, comprising:
    a first electronic component and a second electronic component openable relative to each other;
    an open-close detector, configured to detect a close operation of the first electronic relative to the second electronic component to generate a trigger signal;
    at least one touch sensor, disposed on at least one of the first electronic component and the second electronic component, configured to generate touch information in response to a touch event being sensed;
    a processor, coupled to the open-close detector and the at least one touch sensor, configured to determine a close gesture according to the trigger signal and the touch information, select and operate in a corresponding power mode within the plurality of power modes by the electronic device according to a correspondence relationship of the close gesture and the plurality of power modes;
    a setting interface, configured to be displayed on a screen of one of the first electronic component and the second electronic component to selectively set the correspondence relationship of the close gesture and the plurality of power modes; and
    an input device, configured to receive external signals and selectively set the correspondence relationship of the close gesture and the plurality of power modes of power modes on the setting interface.

8. The electronic apparatus according to claim 7, wherein the first electronic component is a screen, and the second electronic component is a host having the processor.

9. The electronic apparatus according to claim 7, wherein there are two touch sensors disposed on the at least one of the first electronic component and the second electronic component, and are located on the same side of the at least one of the first electronic component and the second electronic component, in response to only one of the touch sensor being touched, the processor determines as a single-handed close gesture, in response to both of the touch sensors being touched, the processor determines as a two-handed close gesture.

10. The electronic apparatus according to claim 7, wherein the at least one touch sensor is disposed on each of two different sides of the at least one of the first electronic component and the second electronic component, in response to only the at least one touch sensor on one of the sides being touched, the processor determines as a single-handed side close gesture, in response to the at least one touch sensor on both of the sides being touched, the processor determines as a two-handed close gesture.

11. The electronic apparatus according to claim 7, wherein the power modes comprise at least one of shutdown, standby, sleep, hibernate, and maintaining original working status.

* * * * *